J. R. BAKER.
NUT AND BOLT LOCK.
APPLICATION FILED AUG. 26, 1912.
1,100,939.
Patented June 23, 1914.
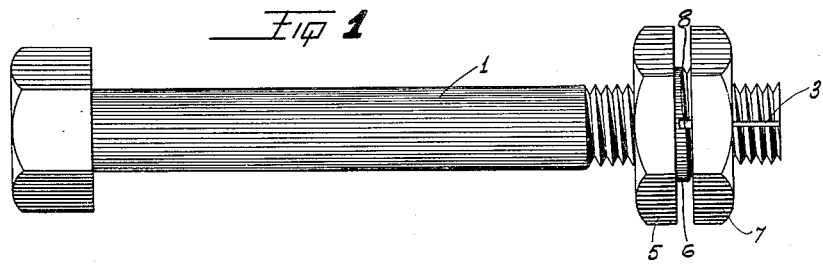
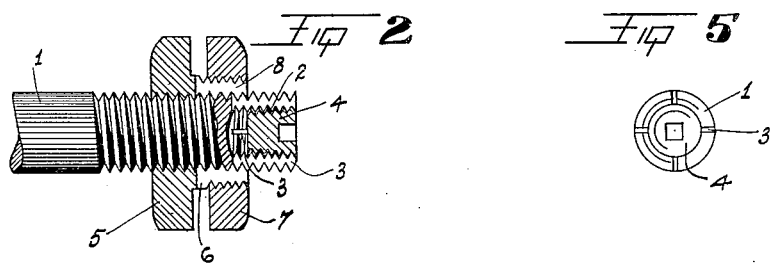 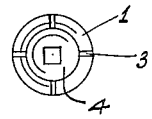
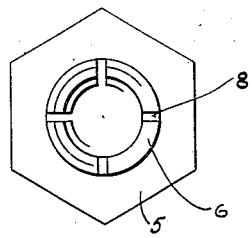 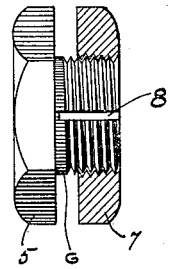
Witnesses
Clarence M. Smith.
J. D. Webster
Jas. R. Baker
Inventor

UNITED STATES PATENT OFFICE.

JAMES R. BAKER, OF STOCKTON, CALIFORNIA.

NUT AND BOLT LOCK.

1,100,939.  Specification of Letters Patent.  Patented June 23, 1914.

Application filed August 26, 1912. Serial No. 716,947.

*To all whom it may concern:*

Be it known that I, JAMES R. BAKER, a citizen of the United States, residing at Stockton, in the county of San Joaquin, State of California, have invented certain new and useful Improvements in Nut and Bolt Locks; and I do declare the following to be a clear, full, and exact description of the same, such as will enable others skilled in the art to which it appertains to make and use the same, reference being had to the accompanying drawings, and to the characters of reference marked thereon, which form a part of this application.

This invention relates to improvements in bolts and nuts, the object of the invention being to produce a lock nut, which lock may be embodied in the nut itself or in the end of the bolt, the principle being the same.

The aim of the invention is to produce such a nut lock as will hold the nut locked in fixed and fast position without any destruction of parts and also in such a manner as to compensate for and overcome the varying conditions due to the expansion and contraction of the metal in the nut and bolt.

A further object of the invention is to produce a simple and inexpensive device and yet one which will be exceedingly effective for the purposes for which it is designed.

These objects, I accomplish by means of such structure and relative arrangement of the parts as will fully appear by a perusal of the following specification and claim.

On the drawings similar characters of reference indicate corresponding parts in the several views.

Figure 1 is a side elevation of the complete device. Fig. 2 is a sectional view of the nut mounted on the bolt. Fig. 3 is a side elevation of the nut showing the locking nut thereon in section. Fig. 4 is an end view of the nut. Fig. 5 is an end view of the bolt.

Referring now more particularly to the characters of reference on the drawings, the numeral 1 designates the bolt which in my improved structure is provided with a threaded orifice 2 in its outer end, the end of the bolt being further provided with a plurality of slits or incisions 3 surrounding the said orifice 2.

The numeral 4 designates a tapered threaded plug adapted to screw into the orifice 2. Thus when the nut 5 is mounted on the bolt and the plug 4 screwed up therein, the tapered construction of such plug gradually bears the split ends of the bolt outwardly into frictional contact with the threads of the nut thus locking such nut in fixed position with respect to the bolt. As can readily be seen this is done gradually by the expansion of the split ends of the bolt and hence does not batter or injure the end of the bolt or the threads of the nut. Also the slits or incisions 3 form a space which will compensate for the expansion or contraction of the nut and bolt without stretching the nut which would cause it to come loose. Also the same slits or incisions form air spaces which receive the air hence cooling the end of the bolt a greater degree than the nut and hence permits it to contract first and expand last which also aids in obviating any stretching of the nut.

In conjunction with the above mentioned locking means in the end of the bolt, I may if desired provide the nut 5 with a projecting shank 6 having interior threads conforming to the threads of the nut and also being provided with an exterior threaded portion adapted to receive a locking nut 7 provided with interior tapered threads adapted to mount on the threaded portion of the shank 6. Said shank 6 is provided with a plurality of slits or incisions 8 similar to the slits and incisions 3. When the nut 5 is mounted on the bolt then the lock nut 7 is mounted on the threaded portion of the shank 6 and owing to its tapering threads it gradually forces the split ends of the shank 6 into frictional contact with the threads of the bolt which locks the nut in position. Similarly as stated above in describing the bolt and nut, the split ends of the shank 6 permit the compensating for the expansion and contraction of the metal without any tendency to stretch the lock nut 7, the slits 8 also giving more air space to the shank 6 to cool the same quicker and prevent it from heating as quick as the balance of the parts. It is well to state at this time that the tapered construction of the plug 4 causes the inner ends to be freed from the threads in the orifice 2 and thus no forcing strain is brought to bear against said plug to tend to force it out of the end of the bolt. Also the same effect is had by reason of the fact that said plug is the smallest member of the entire construction and has no tendency to drop out by its own weight.

From the foregoing description it will be readily seen that I have produced such a device as substantially fulfils the objects of the invention as set forth herein.

While this specification sets forth in detail the present and preferred construction of the device, still in practice such deviations from such detail may be resorted to as do not form a departure from the spirit of the invention.

Having thus described my invention what I claim as new and useful and desire to secure by Letters Patent is:

A device of the character described comprising a bolt provided with a threaded orifice in its end, and a plurality of incisions cut into its end around said orifice, a tapered threaded plug projecting into said orifice, a nut mounted on the outside of said bolt and having interior threads conforming to the normal threads of said bolt, and also being provided with exterior threads, such threaded portion of said nut being provided with a plurality of incisions cut into its end and a nut mounted on the exterior threads of said first named nut, such last named nut having interior tapered threads, as described.

In testimony whereof I affix my signature in presence of two witnesses.

JAMES R. BAKER.

Witnesses:
 JOSHUA B. WEBSTER,
 MABEL G. BOARD.